Patented Feb. 23, 1954

2,669,808

UNITED STATES PATENT OFFICE 2,669,808

GLASS COMPOSITION

James Earle Duncan, Brackenridge, and John J. Smith, Tarentum, Pa., assignors to Pittsburgh Plate Glass Company No Drawing. Application September 15, 1951, Serial No. 246,870

5 Claims. (Cl. 49—92.5)

This invention relates to a novel glass composition and it has particular relation to a specific neutral gray glass composition adapted for production of sheet glass in conventional glass drawing machines and capable of sealing directly to a particular non-alloy steel.

In manufacture of special glasses requiring close control of the batch formula ingredients or ultimate analytical composition, the usual procedure is to form the melt in pots. This necessarily limits production because the process is not continuous and the quantities which can be handled in each melt are small. Ordinarily, however, demand for special glasses is limited and this compensates for the limitations on production methods.

An objective of the invention is the provision of a special glass of closely controlled quality and physical properties, yet particularly adapted for continuous production in large quantities with conventional sheet glass melting and drawing machinery.

The large scale manufacture of television and other cathode ray tubes fabricated with metal shells comprising part of the tube envelope and face plates of glass has created a demand for low cost sheet glass of special physical properties, not all of which are common to ordinary lime-soda glasses such as those produced in sheet or window glass production.

As the art of television tube manufacture has progressed, manufacturers have consistently sought to reduce the cost of tube components while at the same time to increase the quality of performance.

Where it is necessary to create a direct seal between metal and glass, it is essential that the linear coefficients of thermal expansion of the two materials should be nearly the same over a rather wide range of temperatures. Otherwise, the joint or seal cannot withstand the extreme variations in temperature to which it is subjected in manufacture and use. When the glass-metal seal constitutes an element in a structure in which glass is enclosed by the metal, it is frequently desired that the linear coefficient of thermal expansion of the glass should be slightly less than that of the metal. Thus, after melting or softening of the glass, and contacting it with the metal, the seal is formed. Due to the slight differential in coefficients, the glass at the seal is placed under compression when the glass and metal are cooled. If not too exaggerated, this produces a good permanent vacuum-tight seal, particularly in metal-shelled tubes.

At the outset of the production of television tubes comprising metal shells, the tube faces were made of clear glass especially adjusted in composition to afford the proper linear coefficient of expansion for direct sealing to metal shells. The alloys used for fabrication of shells were carefully selected with regard to their necessary physical properties and were relatively expensive. Later, a demand was created for a face plate of neutral color having the property of relatively uniform absorption of light in the portion of the spectrum lying between 440 and 660 millimicrons. A face plate with such absorption properties enhances definition and contrast and otherwise improves viewing of the image produced on the screen, as well recognized in the television art.

A desideratum in the art of manufacturing television tubes is the provision of low-cost sheet glass having closely controlled physical and optical properties so as to afford a medium having the requisite color and light absorptive properties, and in addition a linear coefficient of thermal expansion nearly the same as, or preferably slightly less than, that of metals lower in cost than those heretofore usable. One such metal which is readily available, relatively inexpensive, and otherwise suitable for tube envelope manufacture is known in the trade, according to its S. A. E. designation, as "1010 Steel" which is a cold-rolling, non-alloy steel containing 0.10 per cent by weight of carbon and having a coefficient of thermal expansion of about $14.32 \times 10^{-6}$ per °C. between 25 and 300° C.

The present invention is concerned with the provision of a novel glass which can be directly sealed to 1010 Steel, can be manufactured continuously with conventional window glass machinery, and combines with these attributes the requisite optical, color, and light absorptive qualities to render it useful for fabrication into television tubes.

In order to provide a suitable face plate for television tubes, it is a requirement that the face plate of the television tubes be of a thickness such that the absorption coefficient is uniformly high, say 34%, throughout the spectrum of visible light, especially the range between 440 and 660 millimicrons. This requirement is necessary in order to insure that each luminescent pinpoint of light formed by the impingement of the cathode ray upon the luminescent screen contained on the inner surface of the face plate is transmitted to the outer face plate in a path normal to the plate surfaces, but a large portion of the energy radiated in directions other than a path normal to the viewing surface of the television screen is absorbed by the glass before reaching the viewing surface. Therefore, there is sharp resolution between the light and dark areas of the picture tube. Energy emanating from the pinpoint formed by the phosphorescence which radiates at an angle greater than the critical angle and hence is internally reflected, is for the most part substantially totally absorbed before there is an opportunity to reilluminate the phosphorescent screen after reflection within the face plate.

According to this invention, such glass may be prepared in a conventional process of drawing sheet glass by charging into a melting tank a glass batch made up of the following ingredients in substantially the weight proportions given in Table I.

*Table I*

| Component | Parts by Weight | | | | |
|---|---|---|---|---|---|
| | A | B | C | D | E |
| Sand | 506 | 705 | 485 | 665 | 400 |
| Soda Ash | 258 | 530 | 536 | 625 | 643 |
| Dolomite | 319 | 273 | 311 | 257 | 221 |
| Feldspar | 800 | | 786 | | |
| Potassium Carbonate | 302 | | | | |
| Aplite | | | | 590 | 894 |
| Nepheline Syenite | | 249 | | | |
| Sodium Chloride | 25 | | | | |
| Sodium Sulfate | 10 | | | | |
| Sodium Nitrate | 30 | | | | |
| Arsenic | 7 | | | | |
| Antimony | 7 | | | | |
| Iron | 0.5 | | | | |
| Cobalt Oxide | 0.06 | 0.04 | 0.05 | 0.03 | 0.02 |
| Nickel Oxide | 0.26 | 0.22 | 0.28 | 0.32 | 0.29 |

After conventional melting, refining, and drawing, the sheet glass produced has the following calculated composition. The batch entitled "A" of Table I was employed to obtain the glass having a composition listed under "1" in Table II. The batches entitled "B," "C," "D," and "E" in Table I were employed to obtain glass compositions similar to those entitled "2," "3," "4," and "5," but not exactly the same in chemical composition.

batch ingredients nor, as a necessary corollary, to the precise ultimate analysis of the residual components originating with these batch ingredients. The iron, cobalt, and nickel oxides incorporated in the batch and present in the ultimate glass composition are for the purpose of imparting a neutral tint to the glass, thus achieving the stated objectives. Variations in the total concentration and/or the relative proportions of these three oxides from those above stated may be practiced to increase or decrease the degree of light absorption. Moreover, other coloring agents may be used in lieu thereof, or coloring agents may be omitted.

The arsenic and antimony oxides are incorporated in the batch as fining agents. The invention is not limited to the use of such materials, but other fining agents which are collectively oxidizing in character, and usable as such, may be employed.

The NaCl and Na$_2$SO$_4$ are present in the batch to serve as melting aids. Other melting aids known to those skilled in the art of glass making may be employed so long as they do not appreciably affect the color, coefficient of expansion, and other desired properties of the glass.

Approximately 95 or more per cent of the glass which is the subject of this invention is composed of SiO$_2$, Na$_2$O, K$_2$O, CaO, MgO, and Al$_2$O$_3$. The remaining approximately 5 per cent may be made up of fining agents, melting aids, and coloring agents.

In order that the glass which is the subject of this invention has the desired properties, it is necessary that the sum of the per cent by weight of certain of the oxide contents be within certain ranges, as well as that the individual oxide contents be within the ranges designated in Table I.

It is desired that the sum of the SiO$_2$ and Al$_2$O$_3$ contents of the glass be within the range of 61 to 66.5 per cent by weight, that the alkali content, i. e. the sum of the Na$_2$O and K$_2$O, be within the range of 22 to 27 per cent by weight and that the alkaline earth metal oxide content, i. e. the sum of the CaO and MgO contents, be

*Table II*

| Component | 1 | 2 | 3 | 4 | 5 | Permissible Range | Preferred Range |
|---|---|---|---|---|---|---|---|
| SiO$_2$ | 55.23 | 59.26 | 57.67 | 57.84 | 52.43 | 50–63 | 50–63 |
| Na$_2$O | 10.03 | 23.90 | 18.88 | 22.44 | 22.81 | 1–25 | 15–25 |
| K$_2$O | 16.10 | 0.62 | 4.88 | 0.87 | 1.31 | 0.5–26 | 0.5–7 |
| CaO | 5.27 | 5.96 | 5.50 | 6.46 | 6.80 | 1–10 | 1–10 |
| MgO | 3.62 | 4.17 | 3.81 | 3.18 | 2.68 | 0–8 | 0–8 |
| Al$_2$O$_3$ | 7.46 | 2.94 | 8.06 | 7.98 | 11.88 | 2–12 | 2–12 |
| NaCl | 0.73 | 0.85 | 0.09 | 0.09 | 0.79 | 0.10–1.0 | 0.10–1.0 |
| Na$_2$SO$_4$ | 0.53 | 0.71 | 0.71 | 0.71 | 0.56 | 0.10–1.0 | 0.10–1.0 |
| As$_2$O$_3$ | 0.37 | 0.50 | 0.28 | 0.28 | 0.56 | 0–1.5 | 0–1.5 |
| Sb$_2$O$_3$ | 0.37 | 0.99 | | | | 0–1.5 | 0–1.5 |
| Fe$_2$O$_3$ | 0.29 | | 0.10 | 0.13 | 0.16 | 0.05–1.0 | 0.05–1.0 |
| NiO | 0.0105 | | }0.02 | 0.02 | 0.02 | 0–0.05 | 0–0.05 |
| CoO | 0.0025 | | | | | 0–0.02 | 0–0.02 |
| Specific Gravity (grams/cm.$^3$) | 2.522 | 2.577 | 2.546 | 2.557 | 2.568 | | |
| Coefficient of Thermal Expansion (lineal) (25° C.–300° C.) | 11.71×10$^{-6}$ Per ° C. | 12.37×10$^{-6}$ Per ° C. | 11.74×10$^{-6}$ Per ° C. | 11.85×10$^{-6}$ Per ° C. | 11.74×10$^{-6}$ Per ° C. | | |
| Temperature (° F.) at a Viscosity of 10$^{3.5}$ poises | 1,970 | 1,760 | 1,865 | 1,860 | 1,895 | | |
| Temperature (° F.) at a Viscosity of 10$^{4.5}$ poises | 1,740 | 1,545 | 1,645 | 1,640 | 1,655 | | |
| Temperature (° F.) at a Viscosity of 10$^{7.65}$ poises | 1,285 | 1,184 | 1,240 | 1,237 | 1,249 | | |
| Temperature (° F.) at a Viscosity of 10$^{12.9}$ poises | 960 | 900 | 940 | 955 | 970 | | |
| Temperature (° F.) at a Viscosity of 10$^{15.2}$ poises | 860 | 795 | 840 | 865 | 875 | | |
| Visible Light Transmission at 0.218 inch | 66±3% | 66±3% | 66±3% | 66±3% | 66±3% | | |
| Color | Gray | Clear | Gray | Gray | Gray | | |
| Resistivity (ohm centimeters×10$^7$ at 250° C.) | 6.3 | | | | | | |

The purview of the invention is not limited to the precise relative amounts of certain of the within the range of 7 to 10 per cent by weight in order to maintain the proper coefficient of thermal expansion and make a good quality glass of suitable durability and working properties. It is desired that the coefficient of expansion of the glass be within the range of about 11.2 to $12.5 \times 10^{-6}$ per °C. between 25 and 300° C.

The advantage of manufacturing glasses having compositions within the preferred ranges as set forth in Table II is that, in general, fewer and cheaper batch materials are required to manufacture the glass. It will be noted that the ratio of $Na_2O$ to $K_2O$ is above 2.14 when the alkali content of the glass is within the range of 22 to 27 per cent by weight. This enables the use of common glass batch materials, such as aplite, feldspar, and/or nepheline syenite, to supply the alkali content, and eliminates the necessity of using potash feldspar and potassium carbonate as batch materials. The batches entitled "B," "C," "D," and "E" of Table I are examples of batches which may be used to produce a glass having a composition within the preferred range listed in Table II.

The novel glass composition entitled No. 1 of Table II possesses the unique property of having an unusually high electrical resistivity as well as a high coefficient of thermal expansion. This property constitutes the glass suitable for the production of a neck cone on metal cathode ray tubes, and other comparable uses wherein a glass having a high electrical resistivity is required.

Although the present invention has been described with reference to the specific details of certain embodiments thereof, it is not intended that such details shall be regarded as limitations upon the scope of the invention except insofar as included in the accompanying claims.

What is claimed:

1. A glass having substantially uniform absorption of light in the portion of the visible spectrum lying between 440 and 660 millimicrons comprising:

| Component: | Per cent by weight |
|---|---|
| $SiO_2$ | 50–63 |
| $Na_2O$ | 15–25 |
| $K_2O$ | 0.5– 7 |
| CaO | 1–10 |
| MgO | 0– 8 |
| $Al_2O_3$ | 2–12 | the sum of $SiO_2$ and $Al_2O_3$ being within the range of 61 to 66.5 per cent by weight, the sum of $Na_2O$ and $K_2O$ being within the range of 22 to 27 per cent by weight, and the sum of CaO and MgO being within the range of 7 to 10 per cent by weight.

2. A glass having substantially uniform absorption of light in the portion of the visible spectrum lying between 440 and 660 millimicrons comprising:

| Component: | Per cent by weight |
|---|---|
| $SiO_2$ | 50–63 |
| $Na_2O$ | 15–25 |
| $K_2O$ | 0.5– 7 |
| CaO | 1–10 |
| MgO | 0– 8 |
| $Al_2O_3$ | 2–12 |
| $Fe_2O_3$ | 0.05– 1.0 |
| NiO | 0– 0.05 |
| CoO | 0– 0.02 | the sum of $SiO_2$ and $Al_2O_3$ being within the range of 61 to 66.5 per cent by weight, the sum of $Na_2O$ and $K_2O$ being within the range of 22 to 27 per cent by weight, and the sum of CaO and MgO being within the range of 7 to 10 per cent by weight.

3. A glass to metal seal between 1010 Steel and a glass comprising:

| Component: | Per cent by weight |
|---|---|
| $SiO_2$ | 50–63 |
| $Na_2O$ | 15–25 |
| $K_2O$ | 0.5– 7 |
| CaO | 1–10 |
| MgO | 0– 8 |
| $Al_2O_3$ | 2–12 | the sum of $SiO_2$ and $Al_2O_3$ being within the range of 61 to 66.5 per cent by weight, the sum of $Na_2O$ and $K_2O$ being within the range of 22 to 27 per cent by weight, and the sum of CaO and MgO being within the range of 7 to 10 per cent by weight.

4. A glass to metal seal between 1010 Steel and a glass comprising:

| Component: | Per cent by weight |
|---|---|
| $SiO_2$ | 50–63 |
| $Na_2O$ | 15–25 |
| $K_2O$ | 0.5– 7 |
| CaO | 1–10 |
| MgO | 0– 8 |
| $Al_2O_3$ | 2–12 |
| $Fe_2O_3$ | 0.05– 1.0 |
| NiO | 0– 0.05 |
| CoO | 0– 0.02 | the sum of $SiO_2$ and $Al_2O_3$ being within the range of 61 to 66.5 per cent by weight, the sum of $Na_2O$ and $K_2O$ being within the range of 22 to 27 per cent by weight, and the sum of CaO and MgO being within the range of 7 to 10 per cent by weight.

5. A glass batch comprising:

| Constituent: | Parts by weight |
|---|---|
| Sand | 665 |
| Soda ash | 625 |
| Dolomite | 257 |
| Aplite | 590 |
| Nickel oxide | 0.32 |
| Cobalt oxide | 0.03 |

JAMES EARLE DUNCAN.
JOHN J. SMITH.

References Cited in the file of this patent

UNITED STATES PATENTS

| Number | Name | Date |
|---|---|---|
| 1,615,448 | Frank | Jan. 25, 1927 |
| 2,504,586 | Reinker | Apr. 18, 1950 |
| 2,527,693 | Armistead | Oct. 31, 1950 |
| 2,581,639 | Duncan et al. | Jan. 8, 1952 |